United States Patent Office 2,808,435
Patented Oct. 1, 1957

2,808,435
CHELATING AGENT

Walter T. Young, Jr., Fair Lawn, N. J., assignor to Refined Products Corporation, Lyndhurst, N. J., a corporation of New Jersey No Drawing. Application December 11, 1953,
Serial No. 397,790

4 Claims. (Cl. 260—534)

This invention relates to an improvement in sequestering and chelating agents of the polycarboxylic amino acid type.

The sequestering and chelating agents of this type, which are in common use, are not stable in acid mediums and tend to precipitate the polycarboxylic amino compound as an insoluble acid from solutions having a pH of 6 or lower. This property therefore makes it necessary, for maximum efficiency, to use such sequestering and chelating agents in an alkaline medium.

In many textile operations it is necessary to treat the textiles under acid conditions or to pass from an alkaline to an acid bath and under these conditions the normal sequestering and chelating agent, such as the sodium salt of ethylene diamine tetra acetic acid is precipitated as the insoluble acid of the polycarboxylic amino compound and the calcium, magnesium, iron, and other heavy metals previously sequestered by the sequestering agent, are released from the sequestering and chelating complex and are often deposited on the fabric as insoluble soaps. This may cause greying or yellowing of the fabric, spottiness, uneven dyeing, and other objections.

When the alkali metal salts of polycarboxylic amino acid are used as chelating agents for the introduction of iron or other trace elements into the soil around the roots of trees and plants and for other agricultural purposes, it is necessary to use them in soil which is neither too acid nor too alkaline for them to serve the desired function, and the field of application of such chelating agents is therefore limited.

The sequestering and chelating agent of this type which is most commonly used is the sodium salt of ethylene diamine tetra acetic acid, which however, is precipitated from acid solutions and is only slightly soluble in water and may be recrystalized therefrom so that once precipitated it is no longer available as a chelating and sequestering agent. When the sodium salt of ethylene diamine tetra acetic acids is used to chelate iron or other trace elements for use in adding iron or other trace element to the soil for agricultural purposes, where the soil is too acid the ethylene diamine tetra acetic acid may be deposited as the insoluble acid in the soil and its chelating value lost and when the soil is alkaline the iron or other trace element chelated by the ethylene diamine tetra acetic acid compound tends to precipitate out of the chelating compound.

It is the object of my invention to provide a sequestering and chelating agent which is superior to the sequestering and chelating agents heretofore known, and which is stable in both alkaline and acid solutions, and therefore has a wider range of utility than chelating and sequestering agents of this type previously known.

Another object of my invention is to provide a sequestering and chelating agent which will effectively sequester ferric ions as well as calcium and magnesium ions and other di- and tri-valent metals in both alkaline and acid mediums, and which may therefore be used to supply various trace minerals to trees, plants, and the like, in both acid and alkaline soils.

Another object of my invention is to provide a sequestering and chelating agent which is readily soluble in water and which forms concentrated aqueous solutions with little tendency toward crystal formations in either alkaline or acid solutions.

Another object of my invention is to provide a sequestering agent which being stable in both alkaline and acid solutions may be employed not only as a sequestering agent but as a leveling assistant in textile dyeing and in other textile treating operations where acid conditions exist.

Another object of the invention is to provide a sequestering agent which will have superior foam suds building properties in detergent compositions.

Another object of the invention is to provide a sequestering agent which will possess antichlor properties and which will neutralize or inactivate chlorine when used in contact with textile fibers.

Another object of the invention is to provide a sequestering and chelating agent for use in supplying trace elements to soils deficient in said trace elements which may be used equally well in acid or alkaline soils.

Various other objects and advantages of my invention will appear from the following examples which are illustrative of my new products and the methods of producing the same. The invention is not, however, limited to the specific examples hereinafter given.

EXAMPLE 1

Two hundred ten parts of mono isopropanol ethylene diamine, 40 parts of sodium hydroxide and 320 parts of water are charged into a flask provided with a mechanical stirrer and one inlet feed for aqueous formaldehyde and another inlet feed for aqueous sodium cyanide solution. The materials in the flask are heated to 190–220° F. Then a solution containing 352 parts of 96% sodium cyanide in 560 parts of water is introduced simultaneously with 570 parts of 37% formaldehyde solution. The solutions containing the sodium cyanide and the formaldehyde may be flowed in simultaneously, but the rate of addition must be so regulated that the sodium cyanide is always in excess by at least 10%. The additions are further adjusted so that a reaction temperature of 190–220° F. is maintained. All parts given above are by weight and not by volume. After all the cyanide and formaldehyde have been added, the temperature is raised slowly to 240–250° F. and maintained until all the ammonia fumes have been expelled. Approximately ten hours are required to complete the reaction.

The final product contains approximately 35% of a compound which is believed to be represented by the structural formula:

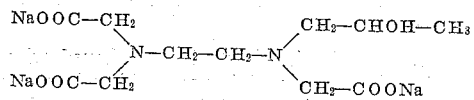

and known as the tri-sodium salt of mono-isopropanol ethylene diamine tri-acetic acid.

This product exhibits excellent sequestering properties for calcium, magnesium, and other di-valent and tri-valent metals, and particularly for ferric ions. It is not precipitated by solutions of strong acids or alkalis. It shows increased foaming and suspending action in the presence of soaps and detergents over the alkali metal salts of ethylene diamine tetra-acetic acid.

EXAMPLE 2

The procedure of Example 1 may be used, but with the following total quantities:

300 parts symmetrical di-isopropanol ethylene diamine
40 parts sodium hydroxide
320 parts water
275 parts sodium cyanide (96%) in 490 parts of water
405 parts formaldehyde (37% solution)

The final reaction product is believed to be represented by the following structural formula:

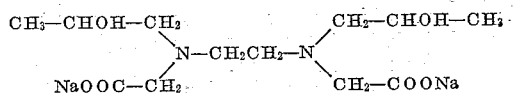

and known as the di-sodium salt of symmetrical di-isopropanol ethylene diamine di-acetic acid.

The properties of this product are in many respects equivalent to those described in Example 1.

EXAMPLE 3

(a) *Preparation of mixed hydroxypropyl ethylene diamine*

A reaction vessel equipped with an agitator, thermometer, dropping funnel and means for heating and cooling was charged with 1242 gms. (18 moles) of 87% ethylene diamine and heated to 55° to 60° C. Propylene oxide was introduced into the vessel drop-wise at such a rate that 348 gms. (6 moles) were introduced over a period of 1½ to 3 hours.

The temperature was maintained below 70° C. although this is not critical. Upon completion of the reaction, excess ethylene diamine was distilled off at atmospheric pressure and recovered. The resulting hydroxyisopropyl ethylene diamine distilled at 99° to 102° C. at 6 mm. Hg. The mixed hydroxyisopropyl ethylene diamine consisted of about 84% of monohydroxy isopropyl ethylene diamine with the remainder mostly dihydroxyisopropyl ethylene diamine.

(b) *Preparation of sodium salts of mixed hydroxypropyl ethylene diamine*

The procedure of Example 1 was used, but with the following proportions:

230 parts of mixed hydroxypropyl ethylene diamine prepared as described above
80 parts sodium hydroxide
250 parts water
350 parts sodium cyanide (96%) in 560 parts of water
570 parts formaldehyde (37% solution)

The final product contains about 35% of a compound which consists of approximately 84% of the compound described in Example 1 and the remainder that compound described in Example 2.

This product is considerably less expensive to manufacture and yet possesses many of the valuable properties of the compounds of Examples 1 and 2.

EXAMPLE 4

(a) *Production of ethylene diamine 1,2 propanediol [N(2,3 dihydroxy propyl) ethylene diamine]*

400 gms. of hydrochloric acid are refluxed with 200 gms. of glycerin for 8 to 10 hours. This mixture is distilled, yielding approximately 120 gms. of glycerol monochlorohydrin, boiling at 110°–130° C. at 10 mm. mercury. The monochlorohydrin is reacted with ethylene diamine in the following manner:

720 gms. 85% ethylene diamine
331.5 gms. glycerol monochlorohydrin

Heat the ethylene diamine to 60° C. Feed in slowly the glycerol monochlorohydrin. Hold temperature of reaction below 80° C. with cooling water, and control feed. When addition is complete, heat to 100° C. for 1 hour to insure complete reaction. Neutralize the resulting amine hydrochloride with caustic soda and distill under vacuum. The excess ethylene diamine water mixture distills over at approximately 43° C. at 35 mm. of mercury. When this is complete, the temperature rises to 170° C. at 8 mm. Hg, and the ethylene diamine 1,2 propanediol begins to distill.

This distillation is continued until all that remains in the flask is NaCl. The distillation will be complete at about 190° C. at 8 mm. Hg.

The amine formed is a viscous liquid which, on standing, crystallizes to a hard hygroscopic solid.

(b) *Production of the trisodium salt of ethylene diamine 1,2 propanediol tri-acetic acid*

The procedure of Example 1 was used but with the following total proportions:

241 parts ethylene diamine 1,2 propanediol
40 parts sodium hydroxide
880 parts water
352 parts sodium cyanide (96%) in 560 parts of water
579 parts formaldehyde (37% solution)

The final product contains about 35% of a compound which is believed to be represented by the structural formula

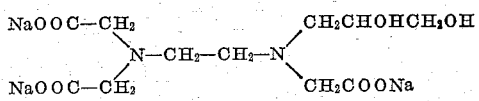

and known as the trisodium salt of ethylene diamine 1,2 propanediol tri-acetic acid.

The properties of this product are in many respects equivalent to those of the product described in Example 1. This compound has calcium and divalent metal sequestering and chelating properties equivalent to the trisodium salt of monopropanol ethylene diamine tri-acetic acid and will chelate about twice as much ferric ions as the latter compound.

Any alkali metal hydroxide or any alkali metal cyanide may be substituted for the sodium hydroxide or sodium cyanide used in the above examples, and substances yielding formaldehyde under the reaction conditions may be used in place of formaldehyde, hydroxy compounds of ethylene diamine or propylene diamine may be substituted for the ethylene diamine propanols listed above. I have found, however, that one or more propanol substitutes must be present to provide compounds having high chelating and sequestering properties and having the desired resistance to precipitation in acid mediums and the desired chelating strength in alkaline solutions.

Products may be produced by the reactions described above which may be represented by the general formula

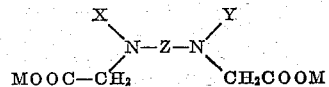

where
X=—CH$_2$CH$_2$OH, —CH$_2$CH$_2$CH$_2$OH,
—CH$_2$—CHOH—CH$_3$,
—CH$_2$—CHOH—CH$_2$OH or —CH$_2$COOM
Y=CH$_2$CH$_2$OH, —CH$_2$CH$_2$CH$_2$OH,
—CH$_2$—CHOH—CH$_3$
or —CH$_2$—CHOH—CH$_2$OH
Z=—CH$_2$CH$_2$— or —CH$_2$CH$_2$CH$_2$—
M=An alkali metal such as Na or K and where at least one of X or Y is —CH$_2$CH$_2$CH$_2$OH,
—CH$_2$—CHOH—CH$_3$ or —CH$_2$CHOH—CH$_2$OH Such products provide superior sequestering and chelating agents which remain soluble in acid or alkaline solutions and which will have higher calcium, magnesium and iron sequestering values than the alkali metal salts of ethylene diamine tetra-acetic acids or other polycarboxylic amino acids heretofore used for this purpose.

In tests comparing the properties of the product produced according to Example 1 with the tetrasodium salt of ethylene diamine tetra-acetic acid, the different products were tested for resistance to precipitation in acid solutions, for chelating properties for iron and resistance to precipitation of chelated iron in alkaline solutions, and for foaming and suds-building properties for detergent compositions, with the following results:

TABLE I

The sodium salts of ethylene diamine tetra-acetic acid and mono-isopropanol ethylene diamine tri-acetic acid in a concentration of 35% sodium salt in water solution were tested for stability in solution at various pH values using hydrochloric acid as the acidifying medium with the following results.

|  | Mono-isopropanol ethylene diamine tri-acetic acid | | | Ethylene diamine tetra-acetic acid | | |
|---|---|---|---|---|---|---|
|  | Appearance | Percent Solubility | Mgs. CaCO3 sequestered per gm. | Appearance | Percent Solubility | Mgs. CaCO3 sequestered per gm. |
| pH 11-12 | Amber liquid. | 60— | 138 | Water white liquid. | 50 | 100 |
| pH 8 | | 60— | 138 | | 36 | 72 |
| pH 5 | Amber liquid. | 60— | 138 | Precipitated. | 11 | 22 |
| pH 2 | ---do----- | 60— | 138 | ---do----- | 3 | 6 |
| pH 1 | ---do----- | 60— | 138 | ---do----- | 0.1 | 0 |

In the above tests, after any precipitation, the precipitate was filtered off and the solution brought back to a pH of 10 before titration for calcium sequestration was begun.

TABLE II

The maximum amount of ferric iron which the compounds would hold was chelated into mono-isopropanol ethylene diamine tri-acetic acid and into ethylene diamine tetra-acetic acid at a pH of 7 and the ability of the compound to retain the chelated iron in solution at various pH values was determined with the following results in terms of milligrams of ferric iron chelated per gram of chelating agent.

|  | Mono-isopropanol ethylene diamine tri-acetic acid | Ethylene diamine tetra-acetic acid |
|---|---|---|
| pH 7 | 107 | 29 |
| pH 8 | 74 | 22 |
| pH 9 | 59 | 0 |
| pH 10 | 52 | 0 |
| pH 11 | 44.5 | 0 |

FOAMING PROPERTIES

A mixture of 50% di-ethanol amine coconut fatty acid condensate was used in the test solution. Additions of 1% to 5% of 50% solutions of the sodium salts of ethylene diamine tetra-acetic and hydroxyisopropyl ethylene diamine di- and tri-acetic acid were added, and the foam determined by means of the Ross-Miles Foam Test. Conditions were a 1% solution of the detergent at 100° F.

| Percent Chelating Agent | Foam in millimeters | |
|---|---|---|
|  | Ethylene diamine tetra-acetic acid | Mixed hydroxy-isopropyl ethylene diamine di- and tri-acetic acid |
| 1 | 115 | 125 |
| 2 | 120 | 160 |
| 3 | 130 | 185 |
| 4 | 160 | 240 |
| 5 | 175 | 240 |
| 0 | 110 | 110 |

A corresponding increase in foaming properties was noted when sodium salts of alkyl aryl sulfonates was used with hydroxypropyl ethylene diamine tri-acetic acid. The sodium salts of lauryl sulfate, some ethylene oxide condensation products of substituted phenols, and certain soaps do not show any response upon the addition of ethylene diamine tetra-acetic acid salts or mixed hydroxypropyl ethylene diamine tri-acetic acid salts. In almost every case, however, where foam was low, there was a marked improvement upon the addition of the sodium salts of hydroxypropyl ethylene diamine tri-acetic acid; where foam was normally high, there was relatively little increase in foam.

While I have set forth certain theories regarding the operation of the processes described herein and certain theories regarding the structure of the compounds produced, it is to be understood that these theories and structures are set forth solely for the purpose of illustration and that my invention is not dependent on the correctness of any theories used.

I claim:

1. As a product of manufacture, a water-soluble chelating agent consisting essentially of an alkali metal salt of a polycarboxylic amino acid of the general formula

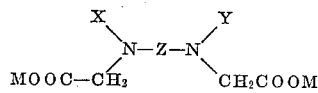

where

X is a radical selected from the group consisting of
—CH2CH2OH, —CH2CH2CH2OH, —CH2—CHOH—CH3,
—CH2—CHOH—CH2OH and —CH2COOM Y is a radical selected from the group consisting of
—CH2CH2CH2OH, —CH2—CHOH—CH3 and
—CH2—CHOH—CH2OH Z is a radical selected from the group consisting of
—CH2CH2— and —CH2CH2CH2— and M is an alkali metal selected from the group consisting of sodium and potassium.

2. As a product of manufacture the tri-alkali metal salt of mono-isopropanol ethylene diamine tri-acetic acid represented by the formula

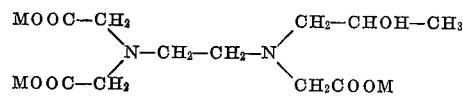

where

M is an alkali metal.

3. As a product of manufacture the dialkali metal salt of symmetrical di-isopropanol ethylene diamine di-acetic acid represented by the formula

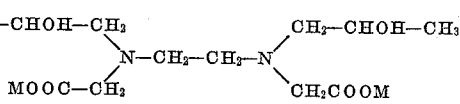

where

M is an alkali metal.

4. As a product of manufacture the alkali metal salts of a mixture of mono-isopropanol and di-isopropanol ethylene diamine di- and tri-acetic acid, said compounds being represented by the formula

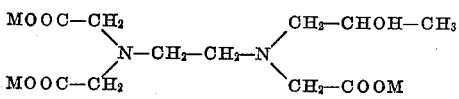

and
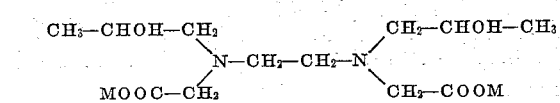
where M is an alkali metal.
References Cited in the file of this patent
UNITED STATES PATENTS
| | | | |
|---|---|---|---|
| 2,407,645 | Bersworth | Sept. 17, | 1946 |
| 2,413,856 | Bersworth | Jan. 7, | 1947 |
| 2,428,353 | Bersworth | Oct. 7, | 1947 |
| 2,532,391 | Bersworth | Dec. 5, | 1950 |
| 2,630,455 | Bersworth | Mar. 3, | 1953 |